June 11, 1929.  H. C. HEBIG  1,716,889
MOTOR HEAT INDICATOR
Filed July 12, 1927   2 Sheets-Sheet 1

INVENTOR
HENRY C. HEBIG
BY
ATTORNEY

June 11, 1929.  H. C. HEBIG  1,716,889

MOTOR HEAT INDICATOR

Filed July 12, 1927   2 Sheets-Sheet 2

INVENTOR
HENRY C. HEBIG
BY Hammond & Littell
ATTORNEY

Patented June 11, 1929.

1,716,889

UNITED STATES PATENT OFFICE.

HENRY C. HEBIG, OF HOFFMANS, NEW JERSEY, ASSIGNOR TO HARRISON HURLBERT BOYCE, OF NEW YORK, N. Y.

MOTOR-HEAT INDICATOR.

Application filed July 12, 1927. Serial No. 205,091.

This invention relates to devices for indicating the heat condition within the cooling system of internal combustion engines in general and especially internal combustion engines of the automotive type.

One of the objects of this invention is to provide in a device for indicating the heat condition within an automotive radiator, a casing for an indicating element, the front and rear faces of which are lens-shaped and carry portions of great magnifying power opposite the portions of the indicating element which corresponds to a dangerous heat condition within the automotive radiator.

Another object of this invention is to provide a transparent or translucent casing of lens form and having areas of greater magnification at various points thereon, for the indicating element of a device for indicating the heat condition within an automotive radiator.

Another object of this invention is to provide a simplified means for attaching the casing for an indicating element of a device for indicating the heat condition within an automotive radiator to a closure device for said radiator.

Another object of this invention is to provide a new and novel method of attaching a band mounting for a unitary casing for the indicating element of a device for indicating the heat condition within an automotive radiator to the supporting base.

Other objects and advantages will become apparent from the following specification, claims and appended drawings in which:—

Figure 4:
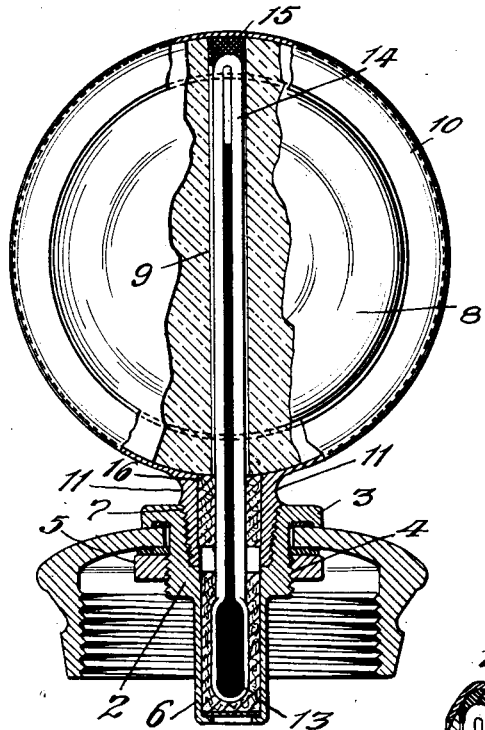
Fig. 4 is an elevational view of my device partly in section to more clearly show the structure thereof.
Figure 6:
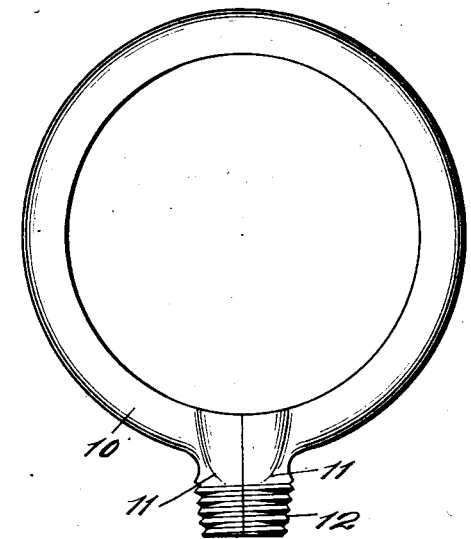
Fig. 6 is a detail view of the mounting ring or band for the indicating element casing.
Figure 5:
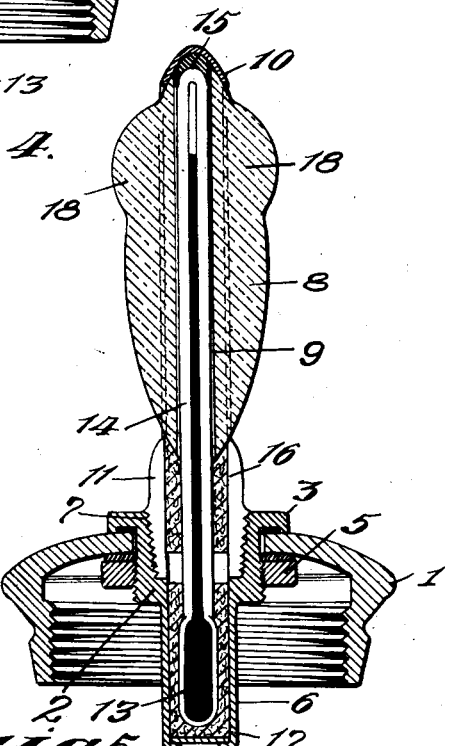
Fig. 5 is a cross-sectional view on the line 5—5 of Fig. 1.

Referring to the drawings, I have designated a radiator cap or closure device by the numeral 1. This radiator cap, as shown in Figs. 4 and 5, is provided with a central aperture. A base member 2 of my indicating device is adapted to pass through this aperture and is provided with a flange 3 seating against the outside of the radiator cap and with a threaded portion 4 within said cap.

A nut 5 cooperates with the threaded portion 4 and locks the member 2 in place upon the radiator cap. Suitable gaskets may be provided between the flange 3 and the radiator cap and also between the nut 5 and said cap. A hollow stem 6 extends downwardly from the member 2, as shown in Figs. 4 and 5. An internal threaded recess 7 is formed in the upper end of the member 2 and substantially concentric with the hollow stem 6.

A casing member 8 of transparent or translucent material such as glass, bakelite, etc., is mounted upon the base member 2 in the following manner and is provided with an aperture 9 extending upwardly from the hollow stem 6 and adapted to receive an indicating element of a heat responsive device mounted within the hollow stem 6. The casing 8 is of double convex lens form and is secured to the base member 2 in the following manner. A channel shaped band 10 is provided for this purpose and extends around and embraces the edge of the casing 8. The ends of the band join on the bottom of the casing and upon each end is formed a downwardly projecting portion 11. These downwardly projecting portions together form substantially a hollow cylindrical portion which is provided at its lower end with threads 12. The threads 12 are adapted to be received in the threaded aperture 7 in the base 2 and to cooperate with the threads in said recess. From the foregoing, it will be apparent that when the band 10 is placed around the periphery of the casing 8, and the projections 11 screw into the threaded aperture 7 said casing will be securely fastened to said base 2.

The heat responsive element hereinbefore referred to is mounted within the hollow stem 6 and is designated in the drawings by the numeral 13. This heat responsive element is provided with an upwardly extending indicating stem 14 extending into the aperture 9 in the casing 8 and seated against a small amount of heat insulating material 16 in the upper end of said aperture. Heat insulating material 16 is provided within members 11 at the base of the casing 8, and heat insulating material 17 securely fastens the heat responsive device 13 in the hollow stem 6.

Figures 1, 2:
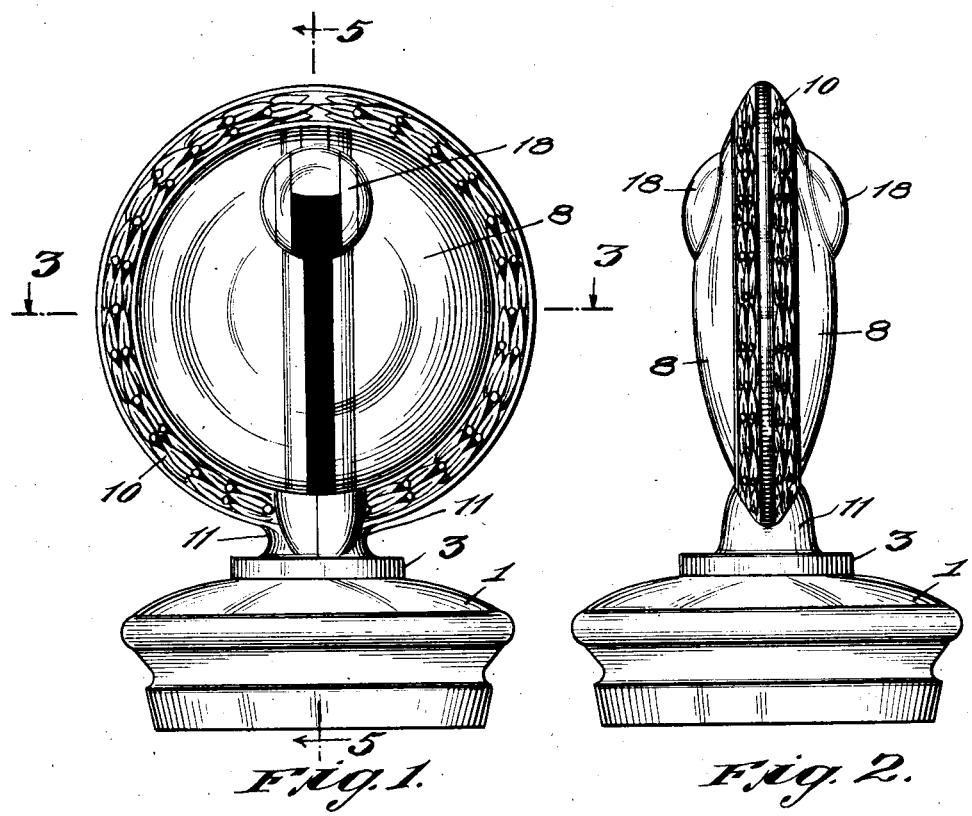
Fig. 1 is a front elevational view of my device applied to an automotive radiator cap.
Fig. 2 is a side elevational view thereof.
Figure 3:
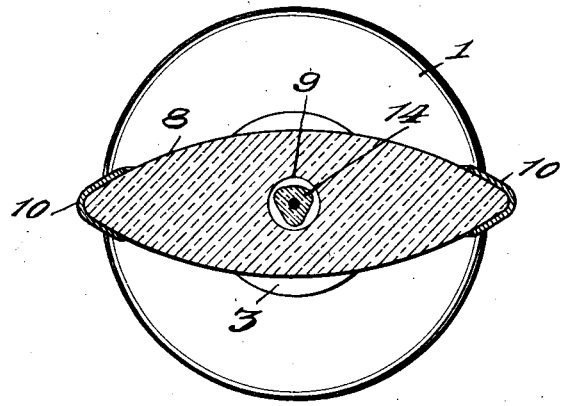
Fig. 3 is a cross-sectional view on the line 3—3 of Fig. 1.

Adjacent that portion of the indicating element 14 which corresponds to the indication of a dangerous heat condition within the automotive radiator to which my device is attached, the lens shaped casing 8 is provided with an area 18 of greater magnifying power, as is clearly shown in Figs. 2 and 5 of the drawings. A similar magnifying area 18 is provided on both the front and rear face of the casing 8 and serves to accentuate the reading of the indicating element 14 to a marked extent in this area thus calling the attention of the operator of the motor vehicle to which my device is attached to the fact of the approach of a dangerous condition within the cooling system whenever the indication of the indicating element reaches this point. In the drawings I have designated these areas by the numeral 18.

The casing 8 may be formed by casting, moulding, grinding or in any other suitable manner from a transparent or translucent substance, such as glass, bakelite, etc. The projections 18 may be formed integral with the casing 8 as shown in the drawings or if desired the projections may be formed separately and secured in place on the casing 8 in any appropriate manner as by cementing.

Various changes in the construction of the embodiment illustrated in the drawings may be made without departing from the spirit of the invention, and I do not therefore desire to limit myself to the specific construction shown and described, but to interpret the invention broadly within the scope of the appended claims.

What I claim as my invention is:

1. In a device for indicating the heat condition within an automotive radiator, a heat responsive device having an indicating element, a base, a unitary light penetratable lens shaped housing for said indicating element, and an accentuating projection on one surface of said lens-shaped housing and adjacent said indicating element, and a split ring embracing said housing for securing said housing to said base.

2. In a device for indicating the heat condition within an automotive radiator, a device responsive to changes in heat condition within said radiator and having an indicating element, a unitary lens-shaped light penetratable housing for said indicating element, having a longitudinal bore therein to receive the heat responsive device, and projecting magnifying areas on the front and rear sides of said lens-shaped housing in line with that portion of said indicating element corresponding to the indicating of a dangerous heat condition within said radiator.

3. In a device for indicating the heat condition within an automotive radiator, a base, a unitary lens shaped housing for the indicating element of a device for indicating the heat condition within said radiator, and means for securing said housing to said base including a split band passing around said housing and secured at both ends to said base.

4. In a device of the class described, a base formed with a threaded recess in the top thereof, a retaining ring for securing a housing to said base formed with outwardly projecting ends having threaded portions cooperating with the threads in the recess in said base.

5. In a device of the class described, a housing, a band embracing said housing and formed with outwardly extending abutting projections at each end, and a base formed with a recess in the top thereof for receiving said abutting projections on the ring ends to secure said band and housing to said base.

6. In a device for indicating the heat condition within an automotive radiator, a lenticular light penetratable housing, a channel-shaped ring embracing the periphery of said housing, downwardly extending abutting projections one on each end of said ring and formed with a threaded portion, and a base formed with a threaded recess in the top thereof cooperating with the threaded portions on said projection for securing said ring and housing to said base.

7. In a device of the class described, a base formed with a threaded recess in the top thereof, a retaining ring for securing a housing to said base formed with outwardly projecting ends having threaded portions cooperating with each other to form a complete thread and with the threads in the recess in said base.

8. In a device for indicating the heat condition within an automotive radiator, a base formed with a downwardly projecting hollow stem and with a threaded recess in the top opening into said hollow stem, a split ring secured to said base by threaded projections one on each end of said ring and cooperating with each other to form a complete thread and with said threaded recess to secure said ring to said base, each projection being formed with a groove and the grooves cooperating to form an aperture extending longitudinally of said projections, a light penetratable housing within said ring and secured to the base thereby and formed with an aperture in line with the aperture formed within the projections on the ends of the ring, and a heat responsive device mounted in said hollow stem and having an indicating element extending into the aperture in said housing.

In testimony whereof I have affixed my signature to this specification.

HENRY C. HEBIG.